J. Leffel,

Water Wheel.

Reissued Oct. 11. 1864.

No. 1,791.

Witnesses;
W. H. Whitney
J. P. Dodge

Inventor;
James Leffel
By Chas. H. Dodge
Attorney

N. PETERS, PHOTO-LITHOGRAPHER, WASHINGTON, D. C.

UNITED STATES PATENT OFFICE.

JAMES LEFFEL, OF SPRINGFIELD, OHIO.

IMPROVEMENT IN WATER-WHEELS.

Specification forming part of Letters Patent No. 34,150, dated January 11, 1862; Reissue No. 1,791, dated October 11, 1864.

DIVISION A.

*To all whom it may concern:*

Be it known that I, JAMES LEFFEL, of Springfield, in the county of Clarke and State of Ohio, have invented certain new and useful Improvements in Water-Wheels; and I hereby declare the following to be a full, clear, and exact description thereof, reference being had to the accompanying drawings, making part of this specification, in which—

Figure 3:
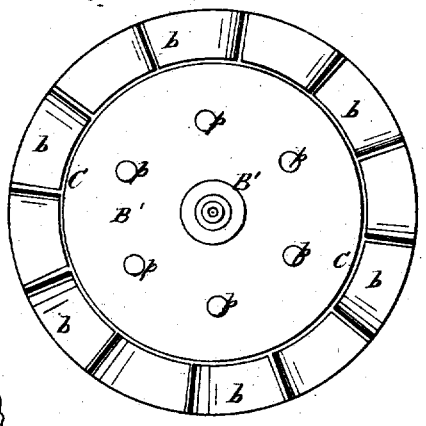
Figure 2:
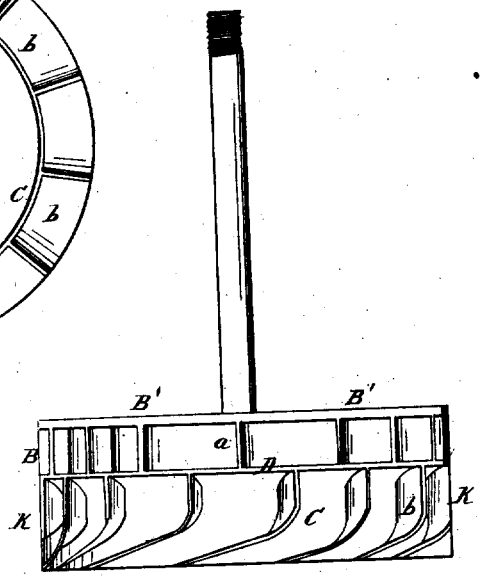
Figure 4:
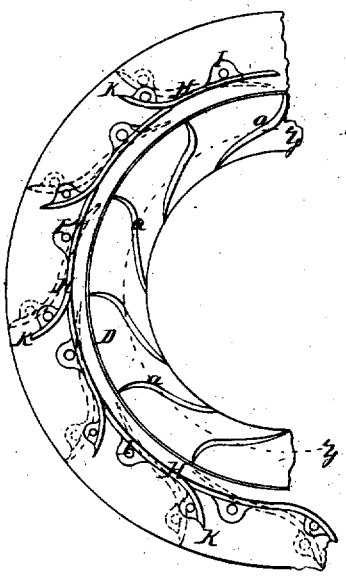
Figure 1:
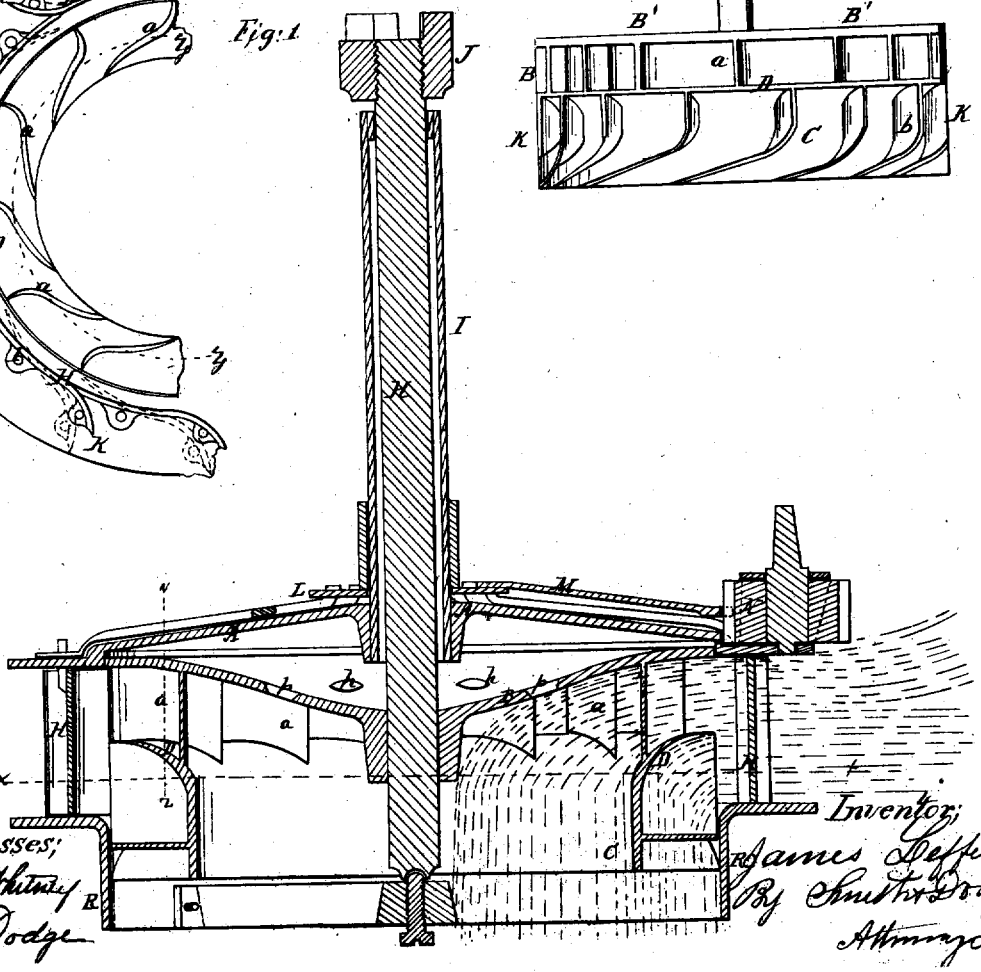

Figure 1 is a vertical section of the wheel and case. Fig. 2 is a side elevation of the wheel. Fig. 3 is a plan view of the wheel, looking from below; and Fig. 4 is a top plan view of a portion of the wheel and case, with the top of each removed so as to show clearly the position of the upper tier of buckets and of the gates in the casing surrounding the same.

Similar letters, wherever they occur in the drawings, indicate corresponding parts.

My invention consists in constructing a wheel, which combines in itself the advantages and principles of both a central and a vertical discharge-wheel.

To enable others skilled in the art to construct and use my improved wheel, I will proceed to describe it.

As will be seen by reference to Fig. 2, I construct my wheel with two tiers of buckets—one in the upper and the other in the lower portion thereof. The upper tier of buckets, *a*, the form of which is clearly shown in Fig. 4, extends from the periphery of the wheel inward about one-eighth of the diameter of the wheel, where they terminate, leaving open spaces between them, so that the water which acts upon them has what is termed, a "central discharge." The lower tier of buckets, *b*, the form of which is shown in Fig. 2, occupy the same radial distance on the diameter of the wheel, but are so formed and located as to give to the water which operates upon them a vertical discharge, the buckets *b* occupying a position directly under or below the buckets *a*, the two tier of buckets being equal in number.

The upper surface of the wheel is composed of a plate, B, which is slightly convex on that part immediately over the buckets *a*, from whence to the center it is concave in form, as clearly shown in Fig. 1. To the under side of this plate B the buckets *a* are secured by being cast solid therewith, the lower edges of said buckets resting upon and being firmly attached to an annular diaphragm, D, which extends from the periphery of the wheel inward on a gradually-increasing downward curve until it reaches a point slightly beyond the inner ends of buckets, *a*, from whence it descends in a vertical direction to the bottom of the wheel, as shown in Figs. 1 and 2. The buckets *b* are arranged at equal distances apart around the outside of and underneath the diaphragm D, and are of such width as to bring their outer edges flush with the peripheries of plate B and diaphragm D, thus making the edges or outer sides of the wheel perpendicular from top to bottom.

The buckets *a* and *b* may, either one or both sets, be made of thin plates of steel or wrought iron and have the plates B and D cast thereon, the buckets in such case being first placed in proper position in the mold for that purpose; or, if desired, one tier of the buckets may be thus made, while the other tier is cast with the plates B and D. The entire wheel may be cast whole, if desired; but I usually construct the upper and lower portions separately and then bolt them together.

The object of curving the diaphragm D, as shown in that portion above the line *x x* of Fig. 1, is twofold.

First. The water operating upon the buckets *a* expends the major portion of its power in its direct action upon that portion of the bucket outside of the line *z z*, Figs. 1 and 4. The velocity of the water having been thus imparted to the wheel by the time it has reached the point *z z*, it follows that it is no longer possessed of any power except that due to its hydrostatic pressure, and this power is now also applied to assist in propelling the wheel by the tendency of the water to flow down the inclined surface of D. The water and wheel, both moving with uniform velocity at *z z*, are in the same relation to each other as they would be if both were at rest or stationary. Now, it is obvious that the water at *z z* would flow in a radial line toward the center of the wheel until it arrived at the line

*x x* were there no obstacle to prevent it; but as that portion of the bucket *a* within the line *z z* extends diagonally backward across the radial line of its natural path, it follows that the water cannot flow in that line, but is deflected from it by the inner portion of the bucket, against which it thus impinges as it flows down the inclined surface of D, thereby expending its remaining power also on the bucket, and finally passes off down the central opening of the wheel almost inert, its power having been thus utilized to the fullest possible extent.

Secondly. By having D curved, as shown in Fig. 1, it is obvious that the momentum of the water entering the lower tier of buckets will have a tendency to raise or press the wheel up by operating against the under curved surface of D, by which means there will be less friction upon the step or pivot, and consequently less of the power of the water will be used up in overcoming the same.

This wheel is intended to be inclosed in a metallic case, both of which are to be submerged, the water entering through openings or gates in the sides of said case upon all the buckets simultaneously, the lower end of said case being connected to a tube which shall be air-tight, and shall have its lower end submerged in the tail-race. These features, however, form the subject of another application for a patent and need not therefore be more fully described here.

As the wheel is entirely covered by a metallic case, it is obvious that there is no downward pressure of the water on its upper surface, the space between the top B of the wheel and the casing A above it being ordinarily filled with air. To provide for keeping it so and to permit the ready exit of any water that may possibly be forced into the space between the periphery of B and the casing surrounding it several holes, *p*, are bored through the plate B, as shown in Figs. 1 and 3.

I would here state that the water by the time it has passed through between the buckets is so completely deprived of its power that instead of rushing up into the upper open space it falls at once out of the open lower end of the wheel.

It will be observed by examining Fig. 1 that the wheel is so placed in the case that the water flowing into the wheel is delivered in equal quantities to both tier of buckets, and the vertical openings or spaces at the bottom of the wheel, for the discharge of the water from the two sets of buckets, are also equal, the area of the opening inclosed by the lower end of D being exactly the same as that between the outside of D and the casing or tube R surrounding it.

A short shaft, H, is secured to the wheel in the usual manner, and extends up through a corresponding sleeve or tube, I, which is attached to the top A of the casing. To the upper end of the shaft H, and above the tube I, is secured a clutch, J, by which it is united to another shaft of any desired length, to connect with the mechainery to be driven. By this means the wheel is prevented from being bound or cramped in case the upper shaft by any means should be thrown out of line with the lower one.

As the water is delivered upon the entire circumference of the wheel at a uniform pressure it follows that there is no thrust or pressure to one side more than another, and hence the wear upon all sides of the pivot, and also of the wheel and casing must be perfectly uniform. By this means also any loss of power by a side pressure is entirely prevented.

Having thus fully described my invention, what I claim as new, and desire to secure by Letters Patent, is—

1. The above-described wheel, constructed with two independent sets of buckets, *a* and *b*, the former having a central and the latter a vertical discharge, substantially as described.

2. Constructing and arranging the annular diaphragm D to operate in the manner and for the purpose herein set forth.

3. In combination with the diaphragm D, the vertically-discharging buckets *b*, when constructed and arranged to operate as and for the purpose set forth.

4. In combination with an upper plate, B, whose inner surface shall be slightly concave in that portion directly over the buckets, making the surface upon which the lower edge of said buckets rest curved, as shown and described.

JAMES LEFFEL.

Witnesses:
DANIEL BREED,
M. ROBINSON.